United States Patent
Weiss et al.

(10) Patent No.: US 8,209,229 B1
(45) Date of Patent: Jun. 26, 2012

(54) METHOD AND SYSTEM FOR DETERMINING THE ACTUAL COST OF A PRODUCT OR SERVICE USING FINANCIAL DATA

(75) Inventors: Benjamin Weiss, Portola Valley, CA (US); Todd M. Fitch, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 1093 days.

(21) Appl. No.: 12/104,081

(22) Filed: Apr. 16, 2008

(51) Int. Cl.
*G06Q 30/00* (2012.01)

(52) U.S. Cl. .................. 705/26.1; 705/26.4; 705/26.61; 705/26.9; 705/27.1; 705/30

(58) Field of Classification Search .................. 705/26, 705/27, 30
See application file for complete search history.

(56) References Cited

U.S. PATENT DOCUMENTS

| | | | |
|---|---|---|---|
| 7,406,436 | B1 | 7/2008 | Reisman |
| 7,702,545 | B1 | 4/2010 | Compton et al. |
| 7,778,890 | B1 | 8/2010 | Bezos |
| 2004/0039604 | A1 | 2/2004 | Tallal |
| 2005/0159962 | A1 | 7/2005 | Weiss et al. |
| 2008/0082349 | A1 | 4/2008 | Zackrison et al. |
| 2008/0255967 | A1* | 10/2008 | Shi ................................. 705/27 |
| 2010/0191619 | A1 | 7/2010 | Dicker et al. |

OTHER PUBLICATIONS

Weiss et al., Method and System for Estimating the Actual Cost of a Product or Service Using Financial Data, U.S. Appl. No. 12/020,457, filed Jan. 25, 2008.
Weiss et al., "Method and System for Estimating the Actual Cost of a Product or Service Using Financial Data", U.S. Appl. No. 12/020,457, filed Jan. 25, 2008.
No author provided, "Expense Tracking: The True Cost of an iPhone, a Car, and Other Things You Don't Know About," Jul. 20, 2007, Mint.com, 6 pages.

* cited by examiner

*Primary Examiner* — Jeffrey A Smith
*Assistant Examiner* — Courtney Stopp
(74) *Attorney, Agent, or Firm* — McKay and Hodgson, LLP; Philip McKay; Sean P. Lewis (57) ABSTRACT

A system and method for determining the actual cost of a product and/or service includes a process for determining the actual cost of a product and/or service whereby financial data associated with one or more "contributing consumers" is obtained from one or more sources. The financial data includes data associated with specific financial transactions. The financial data, and/or specific financial transactions are categorized and/or associated with a specific purchase of a product and/or service. The financial data obtained from one or more contributing consumers is then aggregated, processed, and/or categorized, according to the identified and specific product and/or service associated with the financial data. A "user consumer" then initiates a request for financial data associated with the purchase of a specified product and/or service. The financial data obtained from one or more contributing consumers is then searched and actual price paid data associated with the purchase of the specified product is presented to the user consumer.

24 Claims, 2 Drawing Sheets

METHOD AND SYSTEM FOR DETERMINING THE ACTUAL COST OF A PRODUCT OR SERVICE USING FINANCIAL DATA

BACKGROUND

It is often very important for consumers to determine the cost associated with the purchase of a given product and/or service as accurately as possible. This is true for both budgeting purposes, such as when saving for a given product and/or service, or to determine if a given product and/or service can be immediately purchased with existing funds. However, for many products and services, determining the actual likely total cost of a product and/or service is quite difficult.

For instance, many products and/or services are listed and/or advertised in printed and/or electronic formats at a specific retailer's price, or at a suggested retail price from the manufacturer. However, quite often, a specific retailer's price and/or the suggested retail price is significantly more, or less, than the actual price consumers are paying for the given product or service. This is sometimes due to a manufacturer publishing an artificially high retail price to attract retailers and/or support them. However, in many cases, the difference between a listed retailer/manufacturer price and the actual price being paid is due to discounts, sales, promotions, coupons, regional considerations, and often, simply a better deal being offered by a given retailer.

As a specific example familiar to many consumers, automobiles often have Manufacturer's Suggested Retail Prices (MSRPs) and/or "sticker prices" that are thousands of dollars more than the price most consumers are actually paying for the automobile. However, when a consumer searches the Internet and/or checks a newspaper to find the selling price for a given automobile, it is often the MSRP that is listed as the selling price. In some cases, this inaccuracy can end a potential sale before it even begins as the consumer immediately determines he or she cannot afford the given automobile, and therefore looks to other options. In addition, in the case of an Internet search, the given consumer may indicate a maximum budgeted price for the purchase. In this instance, an inflated MSRP listing price may prevent the consumer from even ever seeing an automobile that, in reality, is selling within the consumer's budgeted amount.

As another specific example, some products and services, such as satellite TV service, wireless Internet, washers, dyers, furnaces, etc. require installation fees and/or disposal fees for the old product being replaced. However, these fees are often not included as part of the listed purchase price and are therefore often not fully considered, and/or budgeted for, by the consumer. As another specific example, shipping costs and/or handling costs of many purchased items can significantly increase the cost of the given product or service. This is particularly true for Internet purchases. However, shipping and handling costs are often not listed as part of the purchase price, or at least not specifically stated. Therefore, these fees are also often not fully considered, and/or budgeted for, by the consumer. Likewise, many purchases of a given product or service include special taxes and/or fees associated with the purchase that are often not included as part of the purchase price, and are often not listed.

As another specific example, when planning an activity for the first time, such as a vacation related activity, the activity itself may have a listed price, but there may also be gratuities and/or equipment rental that must also be paid, or at least are traditionally paid, that are often not part of the actual price for the service. However, theses costs are often not listed as part of the purchase price and are therefore often not fully considered, and/or budgeted for, by the consumer. In addition, when taking part in an event and/or activity, such as staying in hotel, many consumers forget to budget for parking, bell service, valet service, resort fees and taxes, etc.

As a result of the situations described above, it is currently quite difficult to determine the actual total cost associated with many purchases of products and/or services. Consequently, many consumers are faced with unexpected costs associated with a given purchase, and many carefully prepared budgets can be negated by these unexpected costs. This can cause significant consumer stress and all but nullify the consumer's joy and satisfaction with the purchase and/or the service and/or product itself. In other cases, a consumer may unnecessarily put off the purchase of, or fail to make a purchase of, a given product and/or service based on a listed retail price that is significantly higher than the price the consumer would actually have to pay.

SUMMARY

In accordance with one embodiment, a system and method for determining the actual cost of a product and/or service includes a process for determining the actual cost of a product and/or service whereby financial data associated with one or more "contributing consumers" is obtained from one or more sources. In one embodiment, the contributing consumers agree to share the financial data with other "user consumers". In one embodiment, the financial data includes data associated with specific financial transactions and the specific financial transactions are tagged as sharable by the contributing consumers. In one embodiment, the financial data is categorized by the contributing consumers and, in one embodiment, a given financial transaction, or ongoing multiple financial transactions, is/are associated with a specific purchase of a given product and/or service by the contributing consumers. In one embodiment, the financial data obtained from the one or more contributing consumers is aggregated, processed, and/or categorized, according to the product and/or service purchased through the financial transaction. In one embodiment, the aggregated and/or categorized financial data is then stored by the process for determining the actual cost of a product and/or service. In one embodiment, a user consumer then initiates a request for cost data associated with the purchase of a specified product and/or service. In one embodiment, the aggregated and/or categorized financial data obtained from one or more contributing consumers is then searched and results data representing the actual prices paid by contributing consumers for the given product and/or service is obtained. In one embodiment, the results data obtained are then presented to the user consumer in any one of various printed and/or electronic data and/or report formats.

In one embodiment, the financial data obtained from one or more contributing consumers is general financial data representing a given contributing consumer's general and/or overall financial status and/or demographics, including, but not limited to: the contributing consumer's total assets; the contributing consumer's total liabilities/debt; the contributing consumer's net worth; the contributing consumer's average discretionary spending; the contributing consumer's age group; various demographic data regarding the contributing consumer and/or the contributing consumer's spending; the contributing consumer's area of residence; and/or any other data regarding the contributing consumer's general and/or overall financial status desired and/or available. In one embodiment, as discussed below, the contributing consumer's general and/or overall financial status and/or demographics data is used to categorize and/or identify contributing consumers according to various criteria so a user consumer can narrow search results to results from specific "types" of contributing consumers.

In one embodiment, the financial data for one or more contributing consumers includes data regarding a specific financial transaction conducted by the contributing consumer through which the contributing consumer makes a purchase of a specific product and/or service. In one embodiment, the data regarding the specific financial transaction conducted by the contributing consumer includes, but is not limited to: specific items purchased through specific financial transactions; dates of specific financial transactions; payees/payers associated with specific financial transactions; categories of specific financial transactions; total expenditures in specific financial transaction categories over designated time frames; and/or any other data regarding specific financial transactions desired and/or available, and designated as sharable by the contributing consumer.

In one embodiment, the financial data for one or more contributing consumers is obtained from one or more computing system implemented financial management systems as defined herein, and/or as known in the art the time of filing, and/or as developed after the time of filing.

In one embodiment, the contributing consumers agree to share the financial data with user consumers on a transaction-by-transaction approval basis. In one embodiment, the contributing consumers agree to share the financial data with user consumers on a transaction category approval basis. In one embodiment, the contributing consumers agree to share the financial data with user consumers without restriction. In other embodiments, the contributing consumers agree to share the financial data with user consumers based on any restrictions/criteria defined by the contributing consumer.

In one embodiment, the financial data to be shared is tagged as sharable by the contributing consumers using a user interface display and a user interface device, such as those defined herein, known in the art, or developed after the time of filing.

In one embodiment, specific financial transaction data is categorized by the contributing consumer and a specific financial transaction is associated by the contributing consumer with a specific product and/or service purchase, such as the purchase of an automobile, TV, computer, or activity.

In one embodiment, the financial data obtained from one or more contributing consumers is aggregated according to the specific product and/or service purchased through a given financial transaction and/or the categorizations/identifications provided by the contributing consumers. In one embodiment, the financial data obtained from one or more contributing consumers is aggregated according to the specific product and/or service purchased through a given financial transaction, and/or according to a categorization and/or re-categorization, and/or grouping, determined by the process for determining the actual cost of a product and/or service and/or a computing system implemented financial management system.

In one embodiment the contributing consumer financial data is then stored by, or under the control of, the process for determining the actual cost of a product and/or service in a database/memory, as defined herein, known in the art at the time of filing, or as developed after the time of filing.

In one embodiment, a user consumer initiates a request for purchase price data associated with a specified product and/or service using a user interface display and a user interface device. In one embodiment, the user consumer provides other "secondary" search parameters and/or criteria, such as a request to see all results from specific categories of contributing consumers or from contributing consumers having specific financial and/or demographic attributes, or to see all results from a specific region and/or zip code.

In one embodiment, the financial data obtained from one or more contributing consumers is then searched and search results data associated with the purchase of the user consumer specified product and/or service, and/or most closely matching any user consumer defined secondary search parameters and/or criteria, is gathered. In one embodiment, the search results data includes data representing multiple financial transactions from multiple contributing consumers associated with the purchase of the user consumer specified product and/or service.

In one embodiment, the search results data associated with the purchase of the user consumer specified product and/or service, and/or most closely matching any user consumer secondary search parameters and/or criteria, is then presented to the user consumer in any one of various data and/or report formats; in one embodiment showing the actual cost associated with the purchase of the specific product and/or service as an average, and/or by region, and/or by product feature, such as color, etc.

Using the system and method for determining the actual cost of a product and/or service disclosed herein, a potential consumer of a given product and/or service is provided the opportunity to see the financial data associated with other consumer's purchases of the given product and/or service and, in particular, what other consumers actually paid for the given product and/or service. Consequently, using the system and method for determining the actual cost of a product and/or service disclosed herein, a potential consumer of a given product and/or service can learn from the experience of other consumers of the given product and/or service and thereby more readily determine the actual cost associated with the purchase of a given product and/or service. Therefore, using the system and method for determining the actual cost of a product and/or service disclosed herein, the potential consumer is far less likely to be faced with unexpected costs associated with a given purchase, or to put off the purchase of a given product and/or service based on overstated suggested retail prices for the given product and/or service.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for determining the actual cost of a product and/or service includes a process for determining the actual cost of a product and/or service whereby financial data associated with one or more "contributing consumers" is obtained from one or more sources. In one embodiment, the contributing consumers agree to share the financial data with other "user consumers". In one embodiment, the financial data includes data associated with specific financial transactions and the specific financial transactions are tagged as sharable by the contributing consumers. In one embodiment, the financial data is categorized by the contributing consumers and a given financial transaction is associated with a specific purchase of a given product and/or service by the contributing consumers. In one embodiment, the financial data obtained from one or more contributing consumers is aggregated, processed, and/or categorized, according to the specific product and/or service purchased that is associated with the financial transaction data. In one embodiment, the aggregated and/or categorized financial data is then stored by the process for determining the actual cost of a product and/or service. In one embodiment, a user consumer then initiates a request for cost data associated with the purchase of a specified product and/or service. In one embodiment, the aggregated and/or categorized financial data obtained from one or more contributing consumers is then searched and results data representing the actual prices paid by contributing consumers for the given product and/or service is obtained. In one embodiment, the results data obtained is then presented to the user consumer in any one of various data and/or report formats.

Hardware System Architecture

FIG. 1 is a block diagram of an exemplary hardware architecture for implementing one embodiment of a system and method for determining the actual cost of a product and/or service, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

Figure 1:
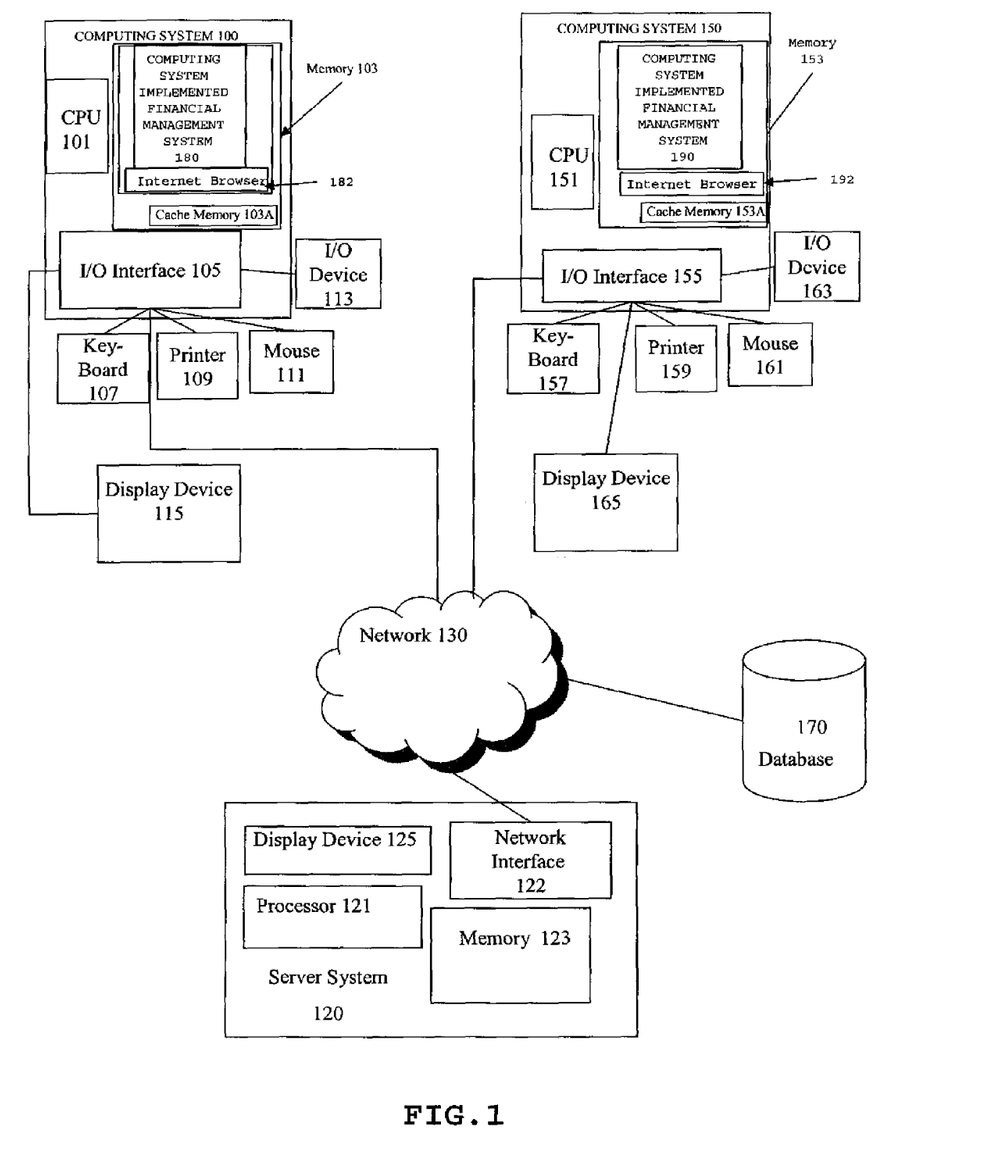
FIG. 1 is a block diagram of an exemplary hardware architecture for implementing one embodiment.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system defined herein, and/or known in the art at the time of filing, and/or as developed thereafter. In one embodiment, computing system implemented data management system 180 is stored, in whole, or in part, in memory system 103, and is used by, or includes, or is accessed by, a process for determining the actual cost of a product and/or service (see FIG. 2, not shown in FIG. 1).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for determining the actual cost of a product and/or service and/or a computing system implemented data management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, financial data representing one or more individual financial transactions (not shown) associated with one or more contributing consumers, is stored, in whole, or in part, in memory system 103, and is used by, or is accessed by, a process for determining the actual cost of a product and/or service. In one embodiment, computing system 100 is a user consumer computing system and/or contributing consumer computing system used, and/or accessible, by another computing system, such as computing system 150 (discussed below).

Computing system 100 can be any computing system as defined herein and/or as known in the art at the time of filing and/or as developed thereafter, that includes components that can execute all, or part, of a process for determining the actual cost of a product and/or service, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, and/or known in the art at the time of filing, and/or as developed thereafter. In one embodiment, computing system implemented data management system 190 is stored, in whole, or in part, in memory system 153, and is used by, or includes, or is accessed by, a process for determining the actual cost of a product and/or service.

In one embodiment, financial data representing one or more individual financial transactions associated with one or more contributing consumers, is stored, in whole, or in part, in memory system 153, and is used by, or is accessed by, a process for determining the actual cost of a product and/or service and/or one or more user consumers. In one embodiment, computing system 150 is a computing system accessible by, and/or under the control of the provider of the process for determining the actual cost of a product and/or service and/or the process for determining the actual cost of a product and/or service. In one embodiment, computing system 150 is used, and/or accessible, by another computing system, such as computing system 100.

Computing system 150 can be any computing system as defined herein and/or as known in the art at the time of filing and/or as developed thereafter, that includes components that can execute all, or part, of a process for determining the actual cost of a product and/or service, and/or a computing system implemented data management system, in accordance with at least one of the embodiments as described herein.

As discussed in more detail below, in one embodiment, all, or part, of a process for determining the actual cost of a product and/or service, and/or a computing system implemented data management system, and/or financial data representing one or more individual financial transactions associated with one or more contributing consumers, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, and/or accessible by, a process for determining the actual cost of a product and/or service, and/or a computing system implemented data management system.

In one embodiment, financial data representing one or more individual financial transactions associated with one or more contributing consumers, is stored, in whole, or in part, in database 170, and is used by, or is accessed by, a process for determining the actual cost of a product and/or service and/or one or more user consumers. In one embodiment, database 170 is used, and/or accessible, by a computing system, such as computing systems 100 and/or 150, and/or a server system, such as sever system 120 (discussed below).

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, financial data representing one or more individual financial transactions associated with one or more contributing consumers, is stored, in whole, or in part, in server system 120, and is used by, or is accessed by, a process for determining the actual cost of a product and/or service. In one embodiment, server system 120 is used, and/or accessible, by a computing system, such as computing systems 100 and/or 150, one or more user consumers, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for determining the actual cost of a product and/or service, and/or a computing system implemented data management system, and/or financial data representing one or more individual financial transactions associated with one or more contributing consumers, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for determining the actual cost of a product and/or service, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for determining the actual cost of a product and/or service and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for determining the actual cost of a product and/or service, and/or a computing system implemented data management system, and/or financial data representing one or more individual financial transactions associated with one or more consumers, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "contributing consumer", denotes any party and/or entity for whom, or from whom, financial data, and/or financial transaction data, and/or purchase information is obtained by a process for determining the actual cost of a product and/or service, and/or a person and/or entity for whom, or from whom, financial data, and/or financial transaction data, and/or purchase information is obtained by a process for determining the actual cost of a product and/or service, and/or a legal guardian of person and/or entity for whom, or from whom, financial data, and/or financial transaction data, and/or purchase information is obtained by a process for determining the actual cost of a product and/or service, and/or an authorized agent of any party and/or person and/or entity for whom, or from whom, financial data, and/or financial transaction data, and/or purchase information is obtained by a process for determining the actual cost of a product and/or service.

Herein, the term "user consumer" and "user" are used interchangeably to denote any party and/or entity that interfaces with, and/or to whom information is provided by, a process for determining the actual cost of a product and/or service, and/or a person and/or entity that interfaces with, and/or to whom information is provided by, a process for determining the actual cost of a product and/or service, and/or a legal guardian of person and/or entity that interfaces with, and/or to whom information is provided by, a process for determining the actual cost of a product and/or service, and/or an authorized agent of any party and/or person and/or entity that interfaces with, and/or to whom information is provided by, a process for determining the actual cost of a product and/or service.

As used herein, the term "product" and "product and/or service" and/or "service" are used interchangeably to denote a product, a service, or both a product and a service, or multiple products and/or services that can be purchased and/or otherwise obtained by a contributing consumer and/or a user consumer.

As used herein, the term computing system, denotes, but is not limited to: a portable computer; a workstation; a two-way pager; a cellular telephone; a smart phone; a digital wireless telephone; a Personal Digital Assistant (PDA); an MP3 Player and/or other music and/or video player; a server computer; an Internet appliance; or any other device that include components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; MP3 Players and/or other music and/or video players; server computers; or any desired combination of these devices, that are coupled to perform the processes and/or operations as described herein.

As used herein, the term "computing system implemented financial management system" includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for determining the actual cost of a product and/or service includes a process for determining the actual cost of a product and/or service whereby financial data associated with one or more "contributing consumers" is obtained from one or more sources. In one embodiment, the contributing consumers agree to share the financial data with other "user consumers". In one embodiment, the financial data includes data associated with specific financial transactions and the specific financial transactions are tagged as sharable by the contributing consumers. In one embodiment, the financial data is categorized by the contributing consumers and, in one embodiment a given financial transaction is associated with a specific purchase of a given product and/or service by the contributing consumers. In one embodiment, the financial data obtained from one or more contributing consumers is aggregated, processed, and/or categorized, according to the product and/or service purchased that is associated with a specific financial transaction of the financial transaction data. In one embodiment, the aggregated and/or categorized financial data is then stored by the process for determining the actual cost of a product and/or service. In one embodiment, a user consumer then initiates a request for cost data associated with the purchase of a specified product and/or service. In one embodiment, the aggregated and/or categorized financial data obtained from one or more contributing consumers is then searched and results data representing the actual prices paid by contributing consumers for the given product and/or service is obtained. In one embodiment, the results data obtained are then presented to the user consumer in any one of various data and/or report formats.

Figure 2:
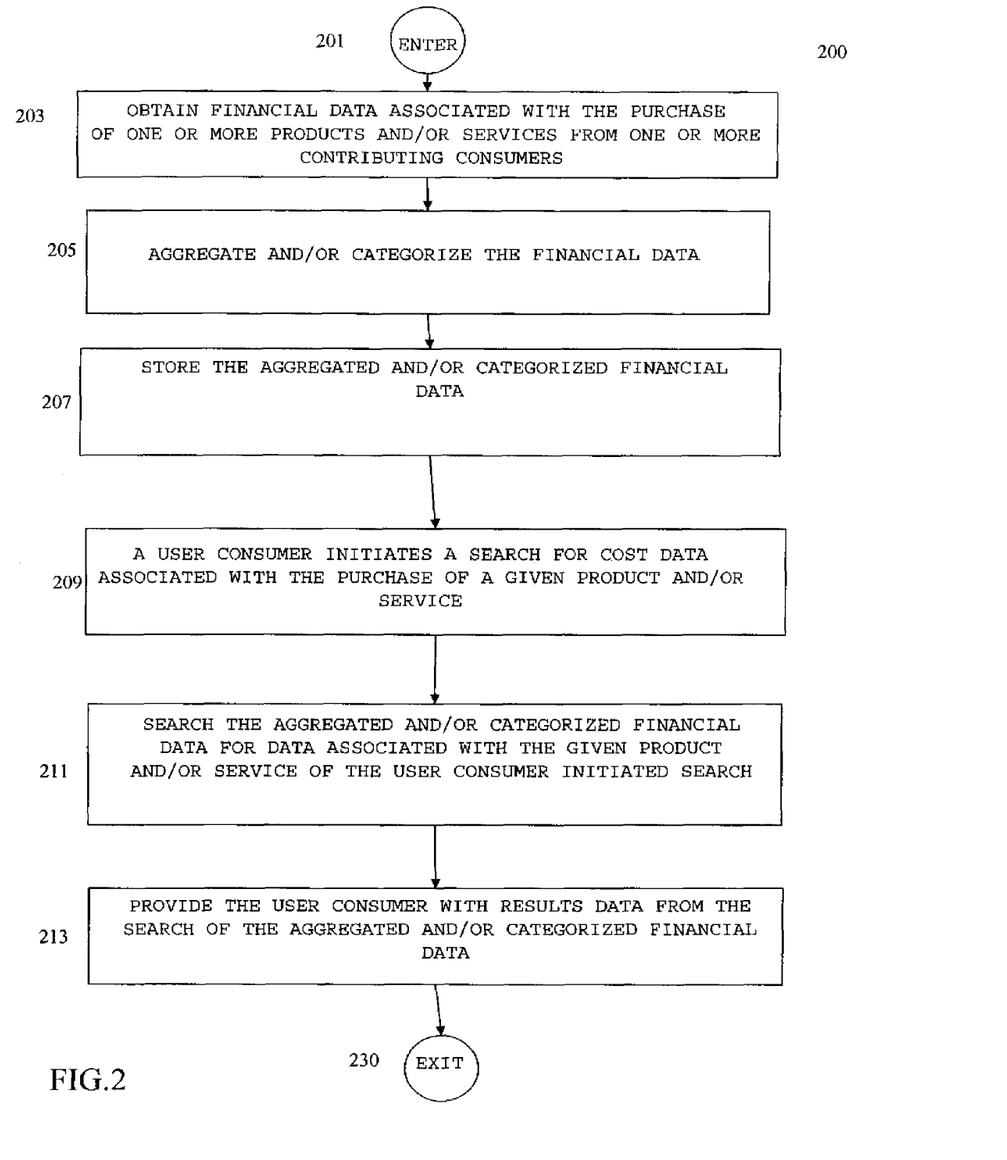
FIG. 2 is a flow chart depicting a process for determining the actual cost of a product and/or service in accordance with one embodiment.

FIG. 2 is a flow chart depicting a process for determining the actual cost of a product and/or service 200 in accordance with one embodiment. Process for determining the actual cost of a product and/or service 200 begins at ENTER OPERATION 201 of FIG. 2 and process flow proceeds to OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 financial data associated with one or more "contributing consumers" is obtained from one or more sources.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with other "user consumers" by any one of various means, including, as discussed below, tagging specific financial data as sharable data.

As also discussed below, in one embodiment, the financial data includes data associated with specific financial transactions through which identified, and specific, products and/or services are purchased and the specific financial transactions are tagged as sharable by the contributing consumers. In one embodiment, the specific financial transactions are categorized by the contributing consumers and/or associated with the identified, and specific, purchase of a given product and/or service.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the financial data obtained from one or more contributing consumers is general financial data representing a given contributing consumer's general and/or overall financial status and/or demographics, including, but not limited to: the contributing consumer's total assets; the contributing consumer's total liabilities/debt; the contributing consumer's net worth; the contributing consumer's average discretionary spending; the contributing consumer's age group; various demographic data regarding the contributing consumer and/or the contributing consumer's spending; the contributing consumer's residence/location; where a contributing consumer shops, geographically speaking; and/or any other data regarding the contributing consumer's general and/or overall financial status desired and/or available. In one embodiment, as discussed below, the contributing consumer's general and/or overall financial status and/or demographics data is used to categorize and/or identify contributing consumers according to various criteria so, as discussed below, a user consumer can narrow search results to results from specific "types" of contributing consumers.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the financial data associated with one or more contributing consumers represents one or more financial transactions conducted by a given contributing consumer. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the financial data representing various financial transactions conducted by the contributing consumer includes, but is not limited to, data representing: specific items purchased through specific financial transactions; dates of specific financial transactions; payees/payers associated with specific financial transactions; categories of specific financial transactions; total expenditures in specific financial transaction categories over designated time frames; the geographic location of specific financial transactions; the geographic location where one or more services and/or products associated with specific financial transactions are used/delivered; and/or any other data regarding specific financial transactions desired and/or available.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the financial data associated with one or more contributing consumers is obtained by process for determining the actual cost of a product and/or service 200 using, and/or through, and/or from, a computing system implemented financial management system, such as system implemented financial management system 180 and/or 190 of FIG. 1, and/or as defined herein, and/or known in the art a the time of filing, and/or as developed after the time of filing.

Returning to FIG. 2, in one embodiment, the financial data associated with one or more contributing consumers obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 includes data associated with financial transactions conducted using multiple payment methods and/or accounts to provide as complete a set of contributing consumer financial data as possible. For instance, in one embodiment, the financial data associated with one or more contributing consumers is obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a contributing consumer to pay for and/or conduct financial transactions.

In addition, in some embodiments, the financial data associated with one or more contributing consumers obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is obtained from multiple sources of the same type. For instance, in one embodiment, the financial data associated with one or more contributing consumers is obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a contributing consumer to pay for and/or conduct financial transactions.

As noted above, in one embodiment, all, or part, of the financial data associated with one or more contributing consumers is obtained by process for determining the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from, or using, a computing system implemented financial management system, such as computing system implemented financial management systems 180 and/or 190 (FIG. 1), that implements, includes, is accessed by, and/or is otherwise associated with process for determining the actual cost of a product and/or service 200 (FIG. 2).

Currently, various computing system implemented financial management systems are available including: computing system implemented personal financial management systems; computing system implemented small business financial management systems; computing system implemented home inventory systems; computing system implemented tax preparation systems; computing system implemented business accounting systems; and computing system implemented medical expense management systems; as well as various other electronic transaction data driven financial/data management systems.

Computing system implemented financial management systems typically help users/contributing consumers manage their finances by providing a centralized interface with banks, credit card companies, and other various financial institutions and/or accounts, for identifying, processing, storing, and categorizing user/contributing consumer financial transactions and other contributing consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, associated with one or more particular products and/or services, and/or with one or more particular payees, and/or one or more specific events.

In one embodiment, the financial data associated with one or more contributing consumers obtained using one or more computing system implemented financial management systems is transferred, or otherwise made available to, process for determining the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203.

In one embodiment, all, or part, of the financial data associated with one or more contributing consumers is obtained by process for determining the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from invoices/bills and/or receipt data provided to process for determining the actual cost of a product and/or service 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for determining the actual cost of a product and/or service 200 is associated with a computing system implemented financial management system, such as computing system implemented financial management systems 180 and/or 190 of FIG. 1, that implement, include, are accessed by, and/or are otherwise associated with process for determining the actual cost of a product and/or service 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for determining the actual cost of a product and/or service 200 in one of numerous locations by one of numerous methods known to those of skill in the art and/or as discussed herein.

In one embodiment, all, or part, of the financial data associated with one or more contributing consumers is obtained by process for determining the actual cost of a product and/or service 200, and/or a computing system implemented financial management system, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions.

In one embodiment, all, or part, of the financial data associated with one or more contributing consumers is obtained by process for determining the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from contributing consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the financial data associated with one or more contributing consumers is obtained by process for determining the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from any combination of the above sources and/or from any other source of financial data associated with one or more contributing consumers whether known at the time of filing or as developed thereafter.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share all or part of their financial data with process for determining the actual cost of a product and/or service 200 and "user consumers" by any one of various means, including, tagging specific financial data as sharable data.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with user consumers on a transaction-by-transaction approval basis. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the contributing consumers agree to share the financial data with user consumers on a transaction category approval basis. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with user consumers without restriction. In other embodiments, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with user consumers based on any restrictions/criteria dictated by the contributing consumer.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, specific financial transaction data is assigned a category/name and/or a description by the contributing consumer and a specific financial transaction is associated by the contributing consumer with a specific product and/or service purchase, such as an automobile, TV, computer, or activity, purchase.

As a specific example, a given financial transaction with a payee of "Circuit Town" is assigned the name "computer X purchase", or a similar name, by the contributing consumer at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203. In this specific example, we also stipulate that the given contributing consumer paid $100.00 for the "computer X purchase", but the suggested retail price for "computer X" is $200.00.

In one embodiment, once the financial data associated with one or more contributing consumers is obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, process flow proceeds to AGGREGATE AND/OR CATEGORIZE THE FINANCIAL DATA OPERATION 205.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated, processed, and/or categorized, according to the identified and specific product and/or service purchased through a given financial transaction from the financial data associated with the contributing consumers.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, is aggregated according to the identified and specific product and/or service purchased through a given financial transaction, and/or the identifications and/or categorizations provided by the contributing consumers and/or another source such as a computing system implemented financial management system.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated according to identified and specific product and/or service purchased through a given financial transaction, and/or categorizations and/or re-categorizations, and/or groupings, determined by process for determining the actual cost of a product and/or service 200 and/or the providers of process for determining the actual cost of a product and/or service 200.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated according to the identified and specific product and/or service purchased through a given financial transaction and any other criteria desired using any one the numerous methods for processing and aggregating data.

Methods, means, processes, procedures and mechanisms for analyzing, aggregating, and categorizing data according to various parameters/criteria are well known in the art. Consequently, a more detailed discussion of any specific methods, means, processes, procedures and mechanisms for analyzing, aggregating, and categorizing data, such as, in one embodiment, is performed at AGGREGATE AND/OR CATEGORIZE THE FINANCIAL DATA OPERATION 205, is omitted here to avoid detracting from the invention.

Continuing with the specific illustrative example introduced above, recall a given specific financial transaction with a payee of "Circuit Town" was assigned the name "computer X purchase" by one contributing consumer at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203. In one embodiment, in this one example, at AGGREGATE AND/OR CATEGORIZE THE FINANCIAL DATA OPERATION 205 all specific financial transactions assigned the name "computer X purchase" by multiple contributing consumers are aggregated and categorized. In this specific example, we also stipulate that the average contributing consumer paid $110.00 for the "computer X purchase" but, as noted above, the suggested retail price for "computer X" is $200.00, and the given consumer discussed above paid $100.00.

In one embodiment, once the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated, processed, and/or categorized, according to the identified and specific product and/or service purchased and/or associated with the financial data at AGGREGATE AND/OR CATEGORIZE THE FINANCIAL DATA OPERATION 205, process flow proceeds to STORE THE AGGREGATED AND/OR CATEGORIZED FINANCIAL DATA OPERATION 207.

In one embodiment, at STORE THE AGGREGATED AND/OR CATEGORIZED FINANCIAL DATA OPERATION 207, the aggregated and/or categorized contributing consumer financial data of AGGREGATE AND/OR CATEGORIZE THE FINANCIAL DATA OPERATION 205 is stored by, or under the control of, process for determining the actual cost of a product and/or service 200.

In one embodiment, at STORE THE AGGREGATED AND/OR CATEGORIZED FINANCIAL DATA OPERATION 207, the aggregated and/or categorized contributing consumer financial data is stored in whole, or in part, in a database maintained by, accessible by, owned by, or otherwise related to: process for determining the actual cost of a product and/or service 200, and/or a provider of process for determining the actual cost of a product and/or service 200; a computing system implemented financial management system, and/or a provider of a computing system implemented financial management system; a web service and/or ISP; a search engine provider; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the aggregated and/or categorized contributing consumer financial data stored as described above is maintained, in whole, or in part, by: process for determining the actual cost of a product and/or service 200, and/or a provider of process for determining the actual cost of a product and/or service 200; a computing system implemented financial management system, and/or a provider of a computing system implemented financial management system; a web service and/or ISP; a search engine provider; a third party data storage institution; any third party service or institution; or any other parties. In one embodiment, access to the aggregated and/or categorized contributing consumer financial data is then provided to process for determining the actual cost of a product and/or service 200, and/or a computing system implemented financial management system, by providing access to the data and/or providing the data on a computer program product.

Continuing with the specific illustrative example introduced above, recall that at AGGREGATE AND/OR CATEGORIZE THE FINANCIAL DATA OPERATION 205 all specific financial transactions assigned the name "computer X purchase", or a similar designation, by multiple contributing consumers were aggregated and categorized. At STORE THE AGGREGATED AND/OR CATEGORIZED FINANCIAL DATA OPERATION 207 the data representing all the specific financial transactions assigned the name "computer X purchase" by multiple contributing consumers, as categorized and aggregated at AGGREGATE AND/OR CATEGORIZE THE FINANCIAL DATA OPERATION 205 is stored in a database, as defined herein.

In one embodiment, once the aggregated and/or categorized contributing consumer financial data of AGGREGATE AND/OR CATEGORIZE THE FINANCIAL DATA OPERATION 205 is stored by, or under the control of, process for determining the actual cost of a product and/or service 200 at STORE THE AGGREGATED AND/OR CATEGORIZED FINANCIAL DATA OPERATION 207, process flow proceeds to A USER CONSUMER INITIATES A SEARCH FOR COST DATA ASSOCIATED WITH THE PURCHASE OF A GIVEN PRODUCT AND/OR SERVICE OPERATION 209.

In one embodiment, at A USER CONSUMER INITIATES A SEARCH FOR COST DATA ASSOCIATED WITH THE PURCHASE OF A GIVEN PRODUCT AND/OR SERVICE OPERATION 209 a "user consumer" initiates a request for financial data associated with the purchase of a specified product and/or service.

In one embodiment, at A USER CONSUMER INITIATES A SEARCH FOR COST DATA ASSOCIATED WITH THE PURCHASE OF A GIVEN PRODUCT AND/OR SERVICE OPERATION 209 a "user consumer" initiates a search for financial data associated with the purchase of a specified product and/or service using a search engine associated with process for determining the actual cost of a product and/or service 200, and/or otherwise capable of accessing the aggregated and/or categorized contributing consumer financial data of AGGREGATE AND/OR CATEGORIZE THE FINANCIAL DATA OPERATION 205. In one embodiment, this initial search finds the suggested retail price for the specified product and/or service. However, as discussed below, this initial search result is modified/supplemented by process for determining the actual cost of a product and/or service 200.

In one embodiment, at A USER CONSUMER INITIATES A SEARCH FOR COST DATA ASSOCIATED WITH THE PURCHASE OF A GIVEN PRODUCT AND/OR SERVICE OPERATION 209 the user consumer initiates a request for financial data associated with the purchase of a specified product and/or service using a user interface display and a user interface device, such as defined herein, known in the art, and/or as developed after the time of filing. In one embodiment, at A USER CONSUMER INITIATES A SEARCH FOR COST DATA ASSOCIATED WITH THE PURCHASE OF A GIVEN PRODUCT AND/OR SERVICE OPERATION 209 the user consumer initiates a request for financial data associated with the purchase of a specified product and/or service using a computing system, such as computing systems 100 and 150 of FIG. 1, and/or as defined herein, and/or known in the art, and/or as developed after the time of filing. Returning to FIG. 2, in one embodiment, at A USER CONSUMER INITIATES A SEARCH FOR COST DATA ASSOCIATED WITH THE PURCHASE OF A GIVEN PRODUCT AND/OR SERVICE OPERATION 209 the user consumer initiates a request for financial data associated with the purchase of a specified product and/or service over a network such network 130 of FIG. 2, as defined herein, and/or known in the art, and/or as developed after the time of filing.

In one embodiment, as part of the user consumer initiated request for cost data associated with the purchase of a specified product and/or service, the user consumer provides the name and/or category of a specific product and/or service for which the user consumer desires purchase cost data. The specific product and/or service can be indentified using various data including, but not limited to: a general product and/or service common name, such sky diving, an HDTV, etc; a specific product and/or service common name, such as "Resort Best" in Baja Calif. or a Sony HDTV; a product part and/or model number, such as Ford Mustang; a product part and/or model number and various features, such as a Ford Mustang with a specific engine, body style or color; or any other means for identifying a product and/or service, known in the art, and/or as developed after the time of filing.

In one embodiment, as part of the user consumer initiated request for price data associated with the purchase of a specified product and/or service, the user consumer provides other secondary search parameters and/or criteria, such as a request to see all results from specific categories of contributing consumers, or from contributing consumers having specific financial and/or demographic attributes, or all results from a specific region or zip code.

Recall that, in one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the contributing consumer's general and/or overall financial status and/or demographics data is obtained. In one embodiment, at AGGREGATE AND/OR CATEGORIZE THE FINANCIAL DATA OPERATION 205, the contributing consumer's general and/or overall financial status and/or demographics data is used to categorize and/or identify contributing consumers, and/or their financial data contributed, according to various secondary criteria. In one embodiment, at A USER CONSUMER INITIATES A SEARCH FOR COST DATA ASSOCIATED WITH THE PURCHASE OF A GIVEN PRODUCT AND/OR SERVICE OPERATION 209 a user consumer can then narrow search results to results from specific "types" of contributing consumers with the specific types of contributing consumers being identified based on the contributing consumer's general and/or overall financial status and/or demographics data of OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 and the contributing consumer categorizations of AGGREGATE AND/OR CATEGORIZE THE FINANCIAL DATA OPERATION 205.

Continuing with the specific illustrative example introduced above, recall that at STORE THE AGGREGATED AND/OR CATEGORIZED FINANCIAL DATA OPERATION 207 the data representing all the specific financial transactions assigned the name "computer X purchase", or a similar identification, by multiple contributing consumers, as categorized and aggregated at AGGREGATE AND/OR CATEGORIZE THE FINANCIAL DATA OPERATION 205 was stored in a database, as defined herein. Further recall that the suggested retail price for "computer X" was $200.00, but the average price paid by the contributing consumers was $110.00. In this specific example, we stipulate that at A USER CONSUMER INITIATES A SEARCH FOR COST DATA ASSOCIATED WITH THE PURCHASE OF A GIVEN PRODUCT AND/OR SERVICE OPERATION 209 a user consumer initiates a request for financial data associated with the purchase of a "computer X" through an Internet search engine and the user consumer narrows his search to results from contributing consumers purchasing "computer X" from store in his zip code.

In one embodiment, once a user consumer initiates a request for financial data associated with the purchase of a specified product and/or service at A USER CONSUMER INITIATES A SEARCH FOR COST DATA ASSOCIATED WITH THE PURCHASE OF A GIVEN PRODUCT AND/OR SERVICE OPERATION 209, process flow proceeds to SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211.

In one embodiment, at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 the aggregated and/or categorized contributing consumer financial data stored at STORE THE AGGREGATED AND/OR CATEGORIZED FINANCIAL DATA OPERATION 207 is searched and results data associated with the purchase of the user consumer specified product and/or service of A USER CONSUMER INITIATES A SEARCH FOR COST DATA ASSOCIATED WITH THE PURCHASE OF A GIVEN PRODUCT AND/OR SERVICE OPERATION 209 is obtained.

In one embodiment, at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 the aggregated and/or categorized contributing consumer financial data is searched and search results data associated with the purchase of the user consumer specified product and/or service, and/or most closely matching any user consumer secondary search parameters and/or criteria of A USER CONSUMER INITIATES A SEARCH FOR COST DATA ASSOCIATED WITH THE PURCHASE OF A GIVEN PRODUCT AND/OR SERVICE OPERATION 209, is obtained using any search method and/or search engine known in the art at the time of filing or as developed after the time of filing.

In one embodiment, the search results data associated with the purchase of the user consumer specified product and/or service includes data indicating the actual cost of specific product and/or service. In one embodiment, this data is gathered as results data indicating the average of the prices paid, and/or as individual transactions, and/or as grouped by region, and/or grouped as individual transactions by the price paid, highest to lowest, or lowest to highest. In one embodiment, the search results data associated with the purchase of the user consumer specified product and/or service includes data indicating the actual cost of specific product and/or service according to the user consumer provided secondary search parameters and/or criteria.

Numerous, methods, means, mechanisms, processes and/or procedures for analyzing and/or searching data in response to various search criteria/parameters, are well known to those of skill in the art. Consequently, a more detailed discussion of methods, means, mechanisms, processes and/or procedures for analyzing and/or searching data in response to various search criteria/parameters, such as the analysis/search performed, in one embodiment, at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211, is omitted here to avoid detracting from the invention.

Continuing with the specific illustrative example introduced above, recall that at STORE THE AGGREGATED AND/OR CATEGORIZED FINANCIAL DATA OPERA- TION 207 the data representing all the specific financial transactions assigned the name "computer X purchase", or similar nomenclature, by multiple contributing consumers, as categorized and aggregated at AGGREGATE AND/OR CATEGORIZE THE FINANCIAL DATA OPERATION 205 was stored in a database, as defined herein. At A USER CONSUMER INITIATES A SEARCH FOR COST DATA ASSOCIATED WITH THE PURCHASE OF A GIVEN PRODUCT AND/OR SERVICE OPERATION 209 the user consumer initiated a request for financial data associated with the purchase of a "computer X" and the user consumer narrowed his search to results from contributing consumers purchasing "computer X" from store in his zip code. At SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211, the categorized and aggregated of AGGREGATE AND/OR CATEGORIZE THE FINANCIAL DATA OPERATION 205 is searched and results data is generating including all price actual paid data for "computer X" from stores in the user consumer's zip code.

In one embodiment, it is stipulated that the average price paid for "computer X" in the user consumer's zip code was $105.00. This is as opposed to the suggested retail price of $200.00, and the average price paid by all contributing consumers of $110.00, and the price paid by the given contributing consumer discussed above of $100.00.

In one embodiment, once the aggregated and/or categorized contributing consumer financial data stored at STORE THE AGGREGATED AND/OR CATEGORIZED FINANCIAL DATA OPERATION 207 is searched and results data associated with the purchase of the user consumer specified product and/or service of A USER CONSUMER INITIATES A SEARCH FOR COST DATA ASSOCIATED WITH THE PURCHASE OF A GIVEN PRODUCT AND/OR SERVICE OPERATION 209 is obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211, process flow proceeds to PROVIDE THE USER CONSUMER WITH RESULTS DATA FROM THE SEARCH OF THE AGGREGATED AND/OR CATEGORIZED FINANCIAL DATA OPERATION 213.

In one embodiment, at PROVIDE THE USER CONSUMER WITH RESULTS DATA FROM THE SEARCH OF THE AGGREGATED AND/OR CATEGORIZED FINANCIAL DATA OPERATION 213, the results data obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is presented to the user consumer in any one of various data and/or report formats.

In one embodiment, at PROVIDE THE USER CONSUMER WITH RESULTS DATA FROM THE SEARCH OF THE AGGREGATED AND/OR CATEGORIZED FINANCIAL DATA OPERATION 213 the search results data associated with the purchase of the user consumer specified product and/or service, and/or most closely matching any user consumer secondary search parameters and/or criteria, is presented to the user consumer in any one of various data and/or report formats showing the actual cost associated with the purchase or the specific product and/or service.

In one embodiment, the search results data associated with the purchase of the user consumer specified product and/or service, and/or most closely matching any user consumer secondary search parameters and/or criteria, is presented to the user consumer as a display on a computing system, as defined herein, and/or within an application running on a computing system. For instance, in one embodiment, the search results data associated with the purchase of the user consumer specified product and/or service, and/or most closely matching any user consumer secondary search parameters and/or criteria, is presented to the user consumer as, any of the following: a screen pop-up/pop-up window; a search engine result based display; a Microsoft Windows Vista sidebar gadget display, and/or any other sidebar display; an Internet browser plug-in coupon and/or other display; a pop-up link device; a screen header, footer, sidebar, or frame display; any electronic attachment and/or computing system displayed form; a video and/or audio report; an attachment and/or display associated with a computing system implemented data management system; an attachment and/or display associated a coupon distribution system; and/or any other electronic media based display, known in the art at the time of filing, or as developed/made available after the time of filing.

In one embodiment, at PROVIDE THE USER CONSUMER WITH RESULTS DATA FROM THE SEARCH OF THE AGGREGATED AND/OR CATEGORIZED FINANCIAL DATA OPERATION 213 the results data obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is presented to the user consumer in any one of various data and/or report formats using any of the means for data and/or information transfer discussed herein, and/or known in the art, and/or as developed after the time of filing.

Continuing with the specific illustrative example introduced above, recall that at STORE THE AGGREGATED AND/OR CATEGORIZED FINANCIAL DATA OPERATION 207 the data representing all the specific financial transactions assigned the name "computer X purchase", or other similar name, by multiple contributing consumers, as categorized and aggregated at AGGREGATE AND/OR CATEGORIZE THE FINANCIAL DATA OPERATION 205 was stored in a database, as defined herein. Further recall that the suggested retail price for "computer X" was $200.00, but the average price paid by all the contributing consumers was $110.00, and the average price paid by contributing consumer's in the user zip code was $105.00. In this specific example, we stipulates that at A USER CONSUMER INITIATES A SEARCH FOR COST DATA ASSOCIATED WITH THE PURCHASE OF A GIVEN PRODUCT AND/OR SERVICE OPERATION 209 the user consumer initiated a request for financial data associated with the purchase of a "computer X" through an Internet search engine and the user consumer narrowed his search to results from contributing consumers purchasing "computer X" from store in his zip code. Recall that at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211, the categorized and aggregated of AGGREGATE AND/OR CATEGORIZE THE FINANCIAL DATA OPERATION 205 was searched and results data was generated including all price actual paid data for "computer X" from stores in the user consumer's zip code.

In this specific example, at A USER CONSUMER INITIATES A SEARCH FOR COST DATA ASSOCIATED WITH THE PURCHASE OF A GIVEN PRODUCT AND/

OR SERVICE OPERATION 209, when the user consumer initiates a request for financial data associated with the purchase of a "computer X" through an Internet search engine, the initial results indicate a purchase price of $200.00, the suggested retail price. However, through process for determining the actual cost of a product and/or service 200 at PROVIDE THE USER CONSUMER WITH RESULTS DATA FROM THE SEARCH OF THE AGGREGATED AND/OR CATEGORIZED FINANCIAL DATA OPERATION 213 the results data of SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is displayed to the user as a sidebar display indicating the average purchase price for "computer X" the zip code for the user consumer is actually only $105.00. Consequently, using process for determining the actual cost of a product and/or service 200, the user consumer is provided an actual purchase price, determined from actual contributing consumer data, almost 50% lower than Internet search results alone would have indicated based on the suggested retail price.

The specific example discussed above is hypothetical and presented for illustrative purposes only. Consequently, the specific example discussed above is not meant to limit the scope of the claims presented below in any way.

In one embodiment, once the results data obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is presented to the user consumer in any one of various data and/or report formats at PROVIDE THE USER CONSUMER WITH RESULTS DATA FROM THE SEARCH OF THE AGGREGATED AND/OR CATEGORIZED FINANCIAL DATA OPERATION 213, process flow proceeds to EXIT OPERATION 230. In one embodiment, at EXIT OPERATION 230, process for determining the actual cost of a product and/or service 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for determining the actual cost of a product and/or service 200, a potential consumer of a given product and/or service is provided the opportunity to see the financial data associated with other consumer's purchases of the given product and/or service and, in particular, what other consumers actually paid for the given product and/or service. Consequently, using process for determining the actual cost of a product and/or service 200, a potential consumer of a given product and/or service can learn from the experience of other consumers of the given product and/or service and thereby more readily determine the actual cost associated with the purchase of a given product and/or service. Therefore, using process for determining the actual cost of a product and/or service 200, the potential consumer is far less likely to be faced with unexpected costs associated with a given purchase, or to put off the purchase of a given product and/or service based on overstated suggested retail prices for the given product and/or service.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing", "analyzing", "obtaining", "determining", "collecting", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for estimating the actual cost of a product or service comprising:
   one or more computing processors; and
   one or more memories coupled to the one or more computing processors, the one or more memories having stored therein processor executable code which, when executed by the one or more computing processors, perform a process comprising:
   obtaining financial data associated with one or more contributing consumers, the financial data associated with the one or more contributing consumers comprising data representing one or more financial transactions associated with the purchase of one or more specific products or services by the one or more consumers, the financial data further comprising the contributing consumer's total assets, the contributing consumer's total liabilities/debt, the contributing consumer's net worth and the contributing consumer's average discretionary spending;
   categorizing the one or more financial transactions associated with the purchase of one or more specific products or services by the one or more consumers according to the specific product or service purchased through a given financial transaction, the categorization resulting in the one or more financial transactions being individually categorized according to a product type appropriate for each transaction;
   aggregating the data representing one or more financial transactions associated with the purchase of one or more specific products or services from one or more of the one or more consumers according to the specific product or service purchased through a given financial transaction;
   storing the categorized and aggregated data representing one or more financial transactions associated with the purchase of one or more specific products or services from one or more of the one or more consumers;
   in response to a user consumer initiated search for purchase price data associated with a given product or service, the user consumer initiated search at least including at least one of total assets, total liabilities/debt, net worth and average discretionary spending, searching the categorized and aggregated data representing one or more financial transactions associated with the purchase of one or more specific products or services from one or more of the one or more consumers for data representing one or more financial transactions associated with the purchase of the given product or service from one or more of the one or more consumers; and
   providing the user consumer at least part of the data representing one or more financial transactions associated with the purchase of the given product or service from one or more of the one or more consumers.

2. The computing system implemented process for estimating the actual cost of a product or service of claim 1, wherein;
   the obtained financial data associated with one or more contributing consumers is designated by the one or more contributing consumers as sharable financial data, the designation as sharable being made on a category approval basis.

3. The computing system implemented process for estimating the actual cost of a product or service of claim 1, wherein;
   the financial data associated with one or more contributing consumers is obtained from a computing system implemented financial management system executing on a consumer computing system.

4. The computing system implemented process for estimating the actual cost of a product or service of claim 1, wherein;
   categorizing the one or more financial transactions is performed by the contributing consumers.

5. The computing system implemented process for estimating the actual cost of a product or service of claim 1, wherein;
   categorizing the one or more financial transactions associated with the purchase of one or more specific products or services by the one or more consumers according to the specific product or service purchased through a given financial transaction is performed using a computing system implemented financial management system executing on a consumer computing system.

6. The computing system implemented process for estimating the actual cost of a product or service of claim 1, wherein;
categorizing the one or more financial transactions associated with the purchase of one or more specific products or services by the one or more consumers according to the specific product or service purchased through a given financial transaction is performed using receipt data, the receipt data including the line item entry and product or service identification for each item purchased in the transaction.

7. The computing system implemented process for estimating the actual cost of a product or service of claim 1, wherein;
the user consumer initiated search for purchase price data associated with a given product or service is initiated through the Internet.

8. The computing system implemented process for estimating the actual cost of a product or service of claim 1, wherein;
the user consumer initiated search for purchase price data associated with a given product or service is initiated using a search engine.

9. The computing system implemented process for estimating the actual cost of a product or service of claim 1, wherein;
the user consumer initiated search for purchase price data associated with a given product or service includes one or more secondary search criteria.

10. The computing system implemented process for estimating the actual cost of a product or service of claim 1, wherein;
the process is operative to consider each one of the following secondary search criteria, if specified by a user as a search criteria:
a geographic region where the purchase was made;
specific features of the given product or service
the contributing consumer's age group; and
the contributing consumer's area of residence.

11. The computing system implemented process for estimating the actual cost of a product or service of claim 1, wherein;
providing the user consumer at least part of the data representing one or more financial transactions associated with the purchase of the given product and/or or service from one or more of the one or more consumers comprises providing the user consumer average cost data associated with the purchase of two or more products from the one or more contributing consumers associated with the purchase of the given product or service.

12. The computing system implemented process for estimating the actual cost of a product or service of claim 1, wherein;
providing the user consumer at least part of the data representing one or more financial transactions associated with the purchase of the given product or service from one or more of the one or more consumers comprises providing the user consumer results data in a format chosen from the group of formats consisting of:
a screen pop-up/pop-up window;
a search engine result based display;
a Microsoft Windows Vista sidebar gadget display, or any other sidebar display;
an Internet browser plug-in coupon or other display;
a pop-up link device;
a screen header, footer, sidebar, or frame display;
any electronic attachment or computing system displayed form;
a video report;
an audio report;
an attachment or display associated with a computing system implemented data management system; and
an attachment or display associated a coupon distribution system.

13. A computer program product for providing a process for estimating the actual cost of a product or service comprising:
a nontransitory computer readable storage medium;
and computer program code, encoded on the computer readable storage medium, comprising computer readable instructions for:
obtaining financial data associated with one or more contributing consumers, the financial data associated with the one or more contributing consumers comprising data representing one or more financial transactions associated with the purchase of one or more specific products or services by the one or more consumers, the financial data further comprising the contributing consumer's total assets, the contributing consumer's total liabilities/debt, the contributing consumer's net worth and the contributing consumer's average discretionary spending;
categorizing the one or more financial transactions associated with the purchase of one or more specific products or services by the one or more consumers according to the specific product or service purchased through a given financial transaction, the categorization resulting in the one or more financial transactions being individually categorized according to a product type appropriate for each transaction;
aggregating the data representing one or more financial transactions associated with the purchase of one or more specific products or services from one or more of the one or more consumers according to the specific product or service purchased through a given financial transaction;
storing the categorized and aggregated data representing one or more financial transactions associated with the purchase of one or more specific products or services from one or more of the one or more consumers;
in response to a user consumer initiated search for purchase price data associated with a given product or service, the user consumer initiated search at least including at least one of total assets, total liabilities/debt, net worth and average discretionary spending, searching the categorized and aggregated data representing one or more financial transactions associated with the purchase of one or more specific products or services from one or more of the one or more consumers for data representing one or more financial transactions associated with the purchase of the given product or service from one or more of the one or more consumers; and
providing the user consumer at least part of the data representing one or more financial transactions associated with the purchase of the given product or service from one or more of the one or more consumers.

14. The computer program product for providing a process for estimating the actual cost of a product or service of claim 13, wherein;
the obtained financial data associated with one or more contributing consumers is designated by the one or more contributing consumers as sharable financial data, the designation as sharable being made on a category approval basis.

15. The computer program product for providing a process for estimating the actual cost of a product or service of claim 13, wherein;
  the financial data associated with one or more contributing consumers is obtained from a computing system implemented financial management system executing on a consumer computing system.

16. The computer program product for providing a process for estimating the actual cost of a product or service of claim 13, wherein;
  categorizing the one or more financial transactions is performed by the contributing consumers.

17. The computer program product for providing a process for estimating the actual cost of a product or service of claim 13, wherein;
  categorizing the one or more financial transactions associated with the purchase of one or more specific products or services by the one or more consumers according to the specific product or service purchased through a given financial transaction is performed using a computing system implemented financial management system executing on a consumer computing system.

18. The computer program product for providing a process for estimating the actual cost of a product or service of claim 13, wherein;
  categorizing the one or more financial transactions associated with the purchase of one or more specific products or services by the one or more consumers according to the specific product or service purchased through a given financial transaction is performed using receipt data, the receipt data including the line item entry and product or service identification for each item purchased in the transaction.

19. The computer program product for providing a process for estimating the actual cost of a product or service of claim 13, wherein;
  the user consumer initiated search for purchase price data associated with a given product or service is initiated through the Internet.

20. The computer program product for providing a process for estimating the actual cost of a product or service of claim 13, wherein;
  the user consumer initiated search for purchase price data associated with a given product or service is initiated using a search engine.

21. The computer program product for providing a process for estimating the actual cost of a product or service of claim 13, wherein;
  the user consumer initiated search for purchase price data associated with a given product or service includes one or more secondary search criteria.

22. The computer program product for providing a process for estimating the actual cost of a product or service of claim 13, wherein;
  the process is operative to consider each one of the following secondary search criteria, if specified by a user as a search criteria:
  a geographic region where the purchase was made;
  specific features of the given product or service
  the contributing consumer's age group; and
  the contributing consumer's area of residence.

23. The computer program product for providing a process for estimating the actual cost of a product or service of claim 13, wherein;
  providing the user consumer at least part of the data representing one or more financial transactions associated with the purchase of the given product and/or or service from one or more of the one or more consumers comprises providing the user consumer average cost data associated with the purchase of two or more products from the one or more contributing consumers associated with the purchase of the given product or service.

24. The computer program product for providing a process for estimating the actual cost of a product or service of claim 13, wherein;
  providing the user consumer at least part of the data representing one or more financial transactions associated with the purchase of the given product or service from one or more of the one or more consumers comprises providing the user consumer results data in a format chosen from the group of formats consisting of:
  a screen pop-up/pop-up window;
  a search engine result based display;
  a Microsoft Windows Vista sidebar gadget display, or any other sidebar display;
  an Internet browser plug-in coupon or other display;
  a pop-up link device;
  a screen header, footer, sidebar, or frame display;
  any electronic attachment or computing system displayed form;
  a video report;
  an audio report;
  an attachment or display associated with a computing system implemented data management system; and
  an attachment or display associated a coupon distribution system.

* * * * *

UNITED STATES PATENT AND TRADEMARK OFFICE
CERTIFICATE OF CORRECTION

PATENT NO. : 8,209,229 B1  
APPLICATION NO. : 12/104081  
DATED : June 26, 2012  
INVENTOR(S) : Benjamin Weiss et al.

Page 1 of 1

It is certified that error appears in the above-identified patent and that said Letters Patent is hereby corrected as shown below:

In the Claims

In Column 27, Line 44, Claim 11, between "product" and "or service", delete "and/or";
In Column 28, Line 5, Claim 12, between "associated" and "a coupon", insert --with--;
In Column 30, Line 19, Claim 23, between "product" and "or service", delete "and/or"; and
In Column 30, Line 47, Claim 24, between "associated" and "a coupon", insert --with--.

Signed and Sealed this
Twelfth Day of August, 2014

Michelle K. Lee
*Deputy Director of the United States Patent and Trademark Office*